Sept. 26, 1944. J. VERDERBER 2,358,954
QUILL FEEDING AND ADJUSTING MEANS THEREFOR
Filed Jan. 10, 1940 2 Sheets-Sheet 1

Inventor:
JOSEPH VERDERBER
By Fay, Golrick, Chilton & Isles
Attorney

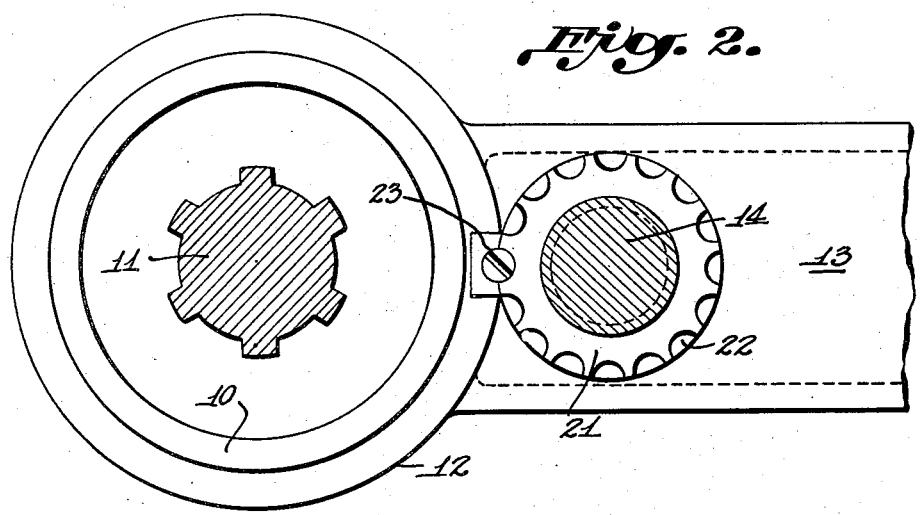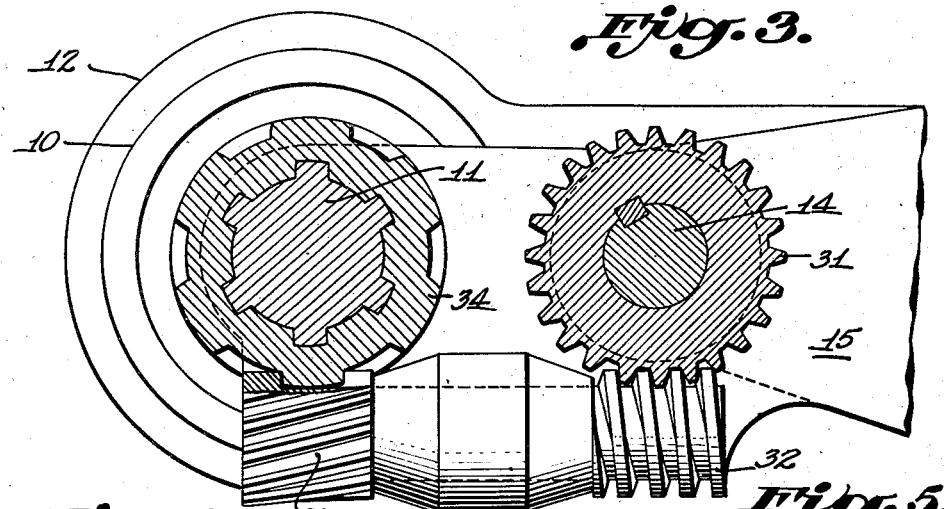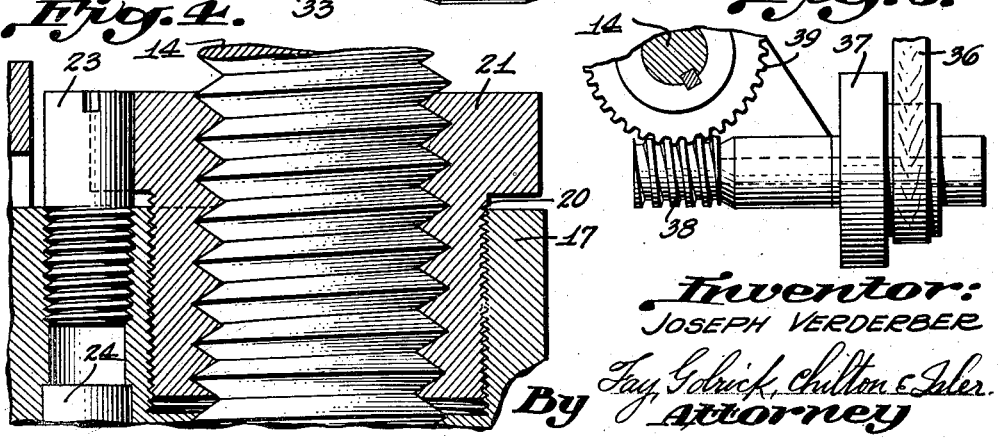

Patented Sept. 26, 1944

2,358,954

UNITED STATES PATENT OFFICE 2,358,954

QUILL FEEDING AND ADJUSTING MEANS THEREFOR

Joseph Verderber, Cleveland, Ohio

Application January 10, 1940, Serial No. 313,217

3 Claims. (Cl. 77—32)

The present invention relates to quill feeding means and adjusting means therefor wherein a quill and equivalents is fed or moved longitudinally thereof and the means for feeding the quill is adjustable relative to the quill for taking up lost motion between the same.

Objects of the present invention are: to feed a quill by a thread like means and to provide an adjustment for the thread like means at the engagement thereof with the quill; to provide a simple means for moving a quill axially; to provide an efficient adjusting means between the quill and the screw like means; to provide a speed change means for varying the speed of movement of the quill; to provide reciprocative travel for the quill; to provide an adjusting means for the engagement between the quill and the screw like means which adjusts the engagement axially of the screw like means; to provide two differently pitched threads cooperating to adjust the engagement between the quill and the screw like means.

Other objects will be pointed out definitely in the description of the device shown in the accompanying drawings, or will become obvious or apparent or will suggest themselves upon inspection of this specification and of the accompanying drawings.

The present invention is illustrated in the accompanying drawings, forming part of this specification, and the drawings show:

Fig. 2 is transverse section, on a larger scale, taken on line 2—2 of Fig. 1.

Fig. 3 is a transverse section, of a modified form of my invention.

Fig. 4 is a sectional view showing the adjusting means of Fig. 1 on a larger scale.

Fig. 5 is a plan view showing a belt drive for the screw and a cone pulley for effecting change of speed of movement of the quill.

Similar reference characters refer to similar parts throughout the views.

Figure 1:
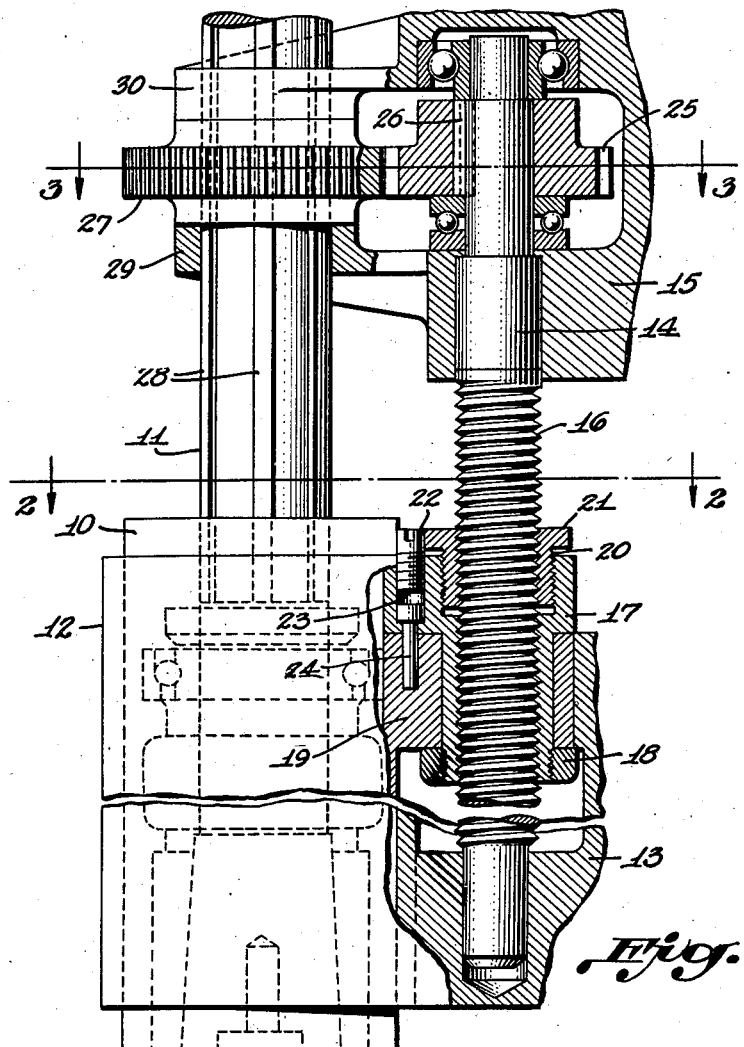
Fig. 1 is a side view, partly in section, showing a quill and its mounting and a feeding means for moving the quill axially.

A quill 10, designed for a boring or similar machine and carrying a spindle 11 rotatable but endwise immovable relative thereto and having means therein for exchangeably carrying tools to be used by the machine, is axially or longitudinally movable and guided in longitudinal movement by part 12 forming a portion of a bracket 13 extending from the machine. A screw 14 is journaled in a hollow bracket 15 also extending from the machine and is also journaled in the bracket 13.

The screw 14 is externally threaded along the middle portion thereof with threads 16 which have a certain pitch threaded into an internally threaded sleeve 17 mounted in the bracket 13 and held against endwise movement therein by a nut 18 threaded onto the lower end of the sleeve 17 and abutting the lower end thereof. A lug 19 extends from and is part of the quill 10 and the screw 14 extends therethrough and is threaded thereto by the lower part of the sleeve 17.

A thread adjusting nut 20 is threaded into the upper part of the sleeve 17 with a thread of less pitch than the pitch of the thread on the screw 14 the head 21 of the nut 20 has notches 22 in the periphery thereof to be engaged by a screw-dowel 23 threaded into the head 17 to keep the nut 20 from rotating. A dowel pin 24 is anchored in the lug 19 and extends upwardly thereof and into the sleeve 17 to keep the same against rotation relative to lug 19.

The screw rotating gear 25 is mounted in a hollow of a bracket 15 and is keyed onto the screw 14 by a key 26. A gear 27 meshes with the gear 25, the former being slidably fitted to the splining 28 of the spindle 11. Arms 29 and 30 extend from the bracket 15, fit loosely over the splines of the spindle and straddle the gear 27 to keep this gear from moving relative to the bracket 15, but permit the spindle 11 to move longitudinally relative to the gear 27 and the bracket 15.

The upper end of the spindle 11 has a means for rotatively driving the spindle 11.

Fig. 3 illustrates a modification to be used when a change of speed is desired between a spindle 11 and a screw 14. A worm wheel 31 is keyed onto a screw 14 and meshes with a worm 32 which is driven by a worm 33 meshing with a worm wheel 34 which is driven by the spindle 11 so that the spindle 11 drives the worm wheel 34 which drives the worm 33 driving the worm 32 which drives the worm wheel 31 and rotates the screw 14. The supporting bracket 35 is part of an extension of the bracket 15. The spur gears and the worm and worm wheels can be replaced by spiral gears for better attainment of speed changing of the screw relative to the spindle. When it is desired that the speed ratio between the screw and the spindle be adjustably changable, the illustration shown in Fig. 5 may be used wherein a belt 36 drives a cone pulley 37 which drives a worm 38 meshing with a worm wheel 39. When it is desired that the feed between the screw 14 and spindle 11 be reversed, the belt may be crosed.

Fig. 4 illustrates the thread adjusting means on a larger scale. The adjusting nut 20 is threaded onto the screw 14 with a thread of a certain pitch and is threaded into the sleeve 17 with a thread of a different pitch. For adjusting the engagement of the screw thread with the thread in the sleeve, the screw dowel 23 is first unscrewed out of the sleeve 17; the nut 20 is then moved rotatively until one side of the thread on the screw 14 contacts one side of the threads in the sleeve 17. This will bring a new notch of the head 21 into position to allow the screw dowel 23 to be screwed back into the sleeve 17 again with the upper part of the screw dowel engaging a new one of the notches and holds the nut 23 against rotation until the screw dowel is again removed for further or additional adjusting of the relations between the threads. The adjusting nut 20, by reason of its threaded engagement with the sleeve 17 always moves parallel with the axis of the screw and the adjustment between the threads is always even all around so that there is the same adjustment all around and more or less adjustment on one side than the other is avoided.

The device here shown and described is simple of structure and operation, has an efficient means for adjusting the threaded engagement between the quill and the screw which moves the quill, has means for varying the speed of travel of the quill and the direction of travel, and the cooperating differently pitched threads affords an efficient and easily operable adjusting means of the thread of the screw relative to the thread of the quill.

I am aware that modifications and changes can be made in the structure and arrangements of elements from the showing herein made within the scope and spirit and intent of this invention and the appended claims. Therefore, without limiting myself to the structure and arrangements of parts as herein shown and described,

I claim:

1. In a machine, the combination of an axially movable quill, a spindle rotatably carried by said quill, an interiorly threaded sleeve carried by said quill, a screw for engaging the threads of said sleeve, a nut engaging said screw, means for maintaining said nut and said sleeve axially stationary relatively to each other, said nut, said sleeve and said quill having surface formations adapted for reception of dowel means, and dowel means for engaging said surface formations whereby relative rotation between said nut, said sleeve, and said quill is prevented.

2. In a machine, the combination of an axially movable quill, a spindle rotatably carried thereby, an axially anchored screw threadingly engaging said quill and means comprising a cone pulley and a worm and gear for rotatably interconnecting said spindle and said screw.

3. In a machine, the combination of an axially movable quill having a lug provided with two interiorly threaded portions of unequal pitch, a spindle rotatably carried by said quill, a screw for engaging those of said interior threads which are of one pitch, an adjusting nut threaded to said screw and also threaded to those of said interior threads which are of another pitch and means for maintaining said nut axially adjusted relatively to said lug whereby back-lash and wear of said screw may be taken up.

JOSEPH VERDERBER.